(12) United States Patent
Weston et al.

(10) Patent No.: US 11,731,477 B2
(45) Date of Patent: Aug. 22, 2023

(54) ENHANCED VEHICLE STABILITY

(71) Applicant: Ford Global Technologies, LLC, Dearborn, MI (US)

(72) Inventors: Keith Weston, Canton, MI (US); Jeffrey John Ley, Brighton, MI (US); Justin DeSordi, Madison Heights, MI (US); Matthew Johnson, Dearborn, MI (US); Nicholas Anthony Quatrano, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 17/128,739

(22) Filed: Dec. 21, 2020

(65) Prior Publication Data
US 2022/0194156 A1    Jun. 23, 2022

(51) Int. Cl.
| | |
|---|---|
| *B62D 17/00* | (2006.01) |
| *B60G 15/06* | (2006.01) |
| *B60W 30/02* | (2012.01) |
| *B60W 10/06* | (2006.01) |
| *B60W 10/184* | (2012.01) |
| *B60W 10/22* | (2006.01) |

(52) U.S. Cl.
CPC ........... *B60G 15/068* (2013.01); *B60W 10/06* (2013.01); *B60W 10/184* (2013.01); *B60W 10/22* (2013.01); *B60W 30/02* (2013.01); *B62D 17/00* (2013.01); *B60W 2520/26* (2013.01); *B60W 2710/0666* (2013.01); *B60W 2710/18* (2013.01); *B60W 2710/22* (2013.01)

(58) Field of Classification Search
None
See application file for complete search history.

(56) References Cited

U.S. PATENT DOCUMENTS

| | | | |
|---|---|---|---|
| 2,605,118 A | 7/1952 | Booth et al. | |
| 2,907,578 A | 10/1959 | Taber | |
| 4,895,383 A | 1/1990 | Abe et al. | |
| 4,971,348 A | 11/1990 | Oyama et al. | |
| 5,094,472 A | 5/1992 | Oyama et al. | |
| 5,143,400 A | 9/1992 | Miller et al. | |
| 7,527,275 B2 | 5/2009 | Choi | |
| 8,346,434 B2 | 1/2013 | Tsukasaki et al. | |
| 8,565,973 B2 | 10/2013 | Wein | |
| 8,973,929 B1* | 3/2015 | Seo | B60G 17/0163 280/86.752 |
| 9,216,625 B2 | 12/2015 | Ramirez Ruiz | |
| 10,112,649 B2 | 10/2018 | Rogers | |

(Continued)

FOREIGN PATENT DOCUMENTS

| | | |
|---|---|---|
| DE | 102015203121 A1 | 8/2016 |
| EP | 2253489 B1 | 4/2015 |

(Continued)

*Primary Examiner* — James M McPherson
(74) *Attorney, Agent, or Firm* — Lorne Forsythe; Bejin Bieneman PLC

(57) ABSTRACT

An assembly includes a leadscrew defining a central axis, a strut movable along the leadscrew upon rotation of the leadscrew, a camber angle of a wheel changeable according to movement of the strut along the leadscrew, and a motor drivably connected to the leadscrew, the motor defining a motor axis, wherein the central axis of the leadscrew is transverse to the motor axis.

20 Claims, 7 Drawing Sheets

(56) References Cited

U.S. PATENT DOCUMENTS

| | | | |
|---|---|---|---|
| 2004/0074693 A1* | 4/2004 | Mattson | B60G 17/0195 |
| | | | 180/446 |
| 2014/0239603 A1 | 8/2014 | Balandin | |
| 2015/0054244 A1* | 2/2015 | Seo | B62D 17/00 |
| | | | 280/86.752 |
| 2017/0113506 A1* | 4/2017 | Tseng | B60G 17/0162 |
| 2018/0201319 A1* | 7/2018 | Rogers | B60G 15/068 |
| 2020/0062063 A1 | 2/2020 | Quatrano | |
| 2020/0270928 A1* | 8/2020 | Cumbo | E05F 15/611 |
| 2022/0025692 A1* | 1/2022 | Henes | E05F 15/63 |

FOREIGN PATENT DOCUMENTS

| | | |
|---|---|---|
| JP | 2841774 B2 | 10/1998 |
| KR | 101461903 B1 | 11/2014 |

* cited by examiner

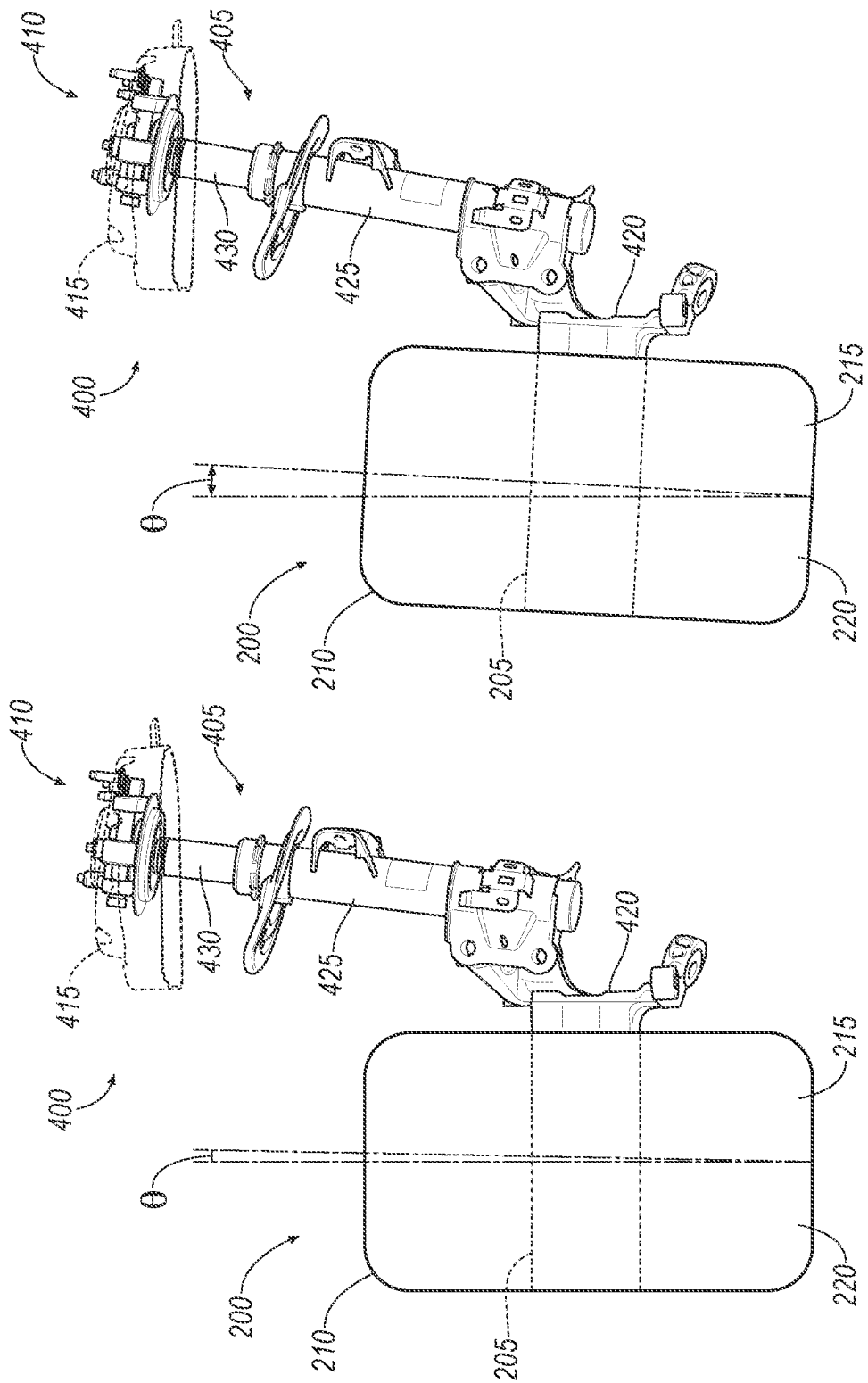

ENHANCED VEHICLE STABILITY

BACKGROUND

Vehicles include components that are typically positioned for conventional driving along a roadway. For example, a tire can be aligned with the roadway such that a surface of the tire substantially evenly contacts the roadway. To adjust the components to operate the vehicle in a different manner, e.g., to adjust the tire to increase handling during a turn, can be difficult, e.g., can require disassembly of one or more vehicle components.

BRIEF DESCRIPTION OF THE DRAWINGS

FIGS. 4A-4B are perspective views of an example suspension of the vehicle.

DETAILED DESCRIPTION

Figure 1:
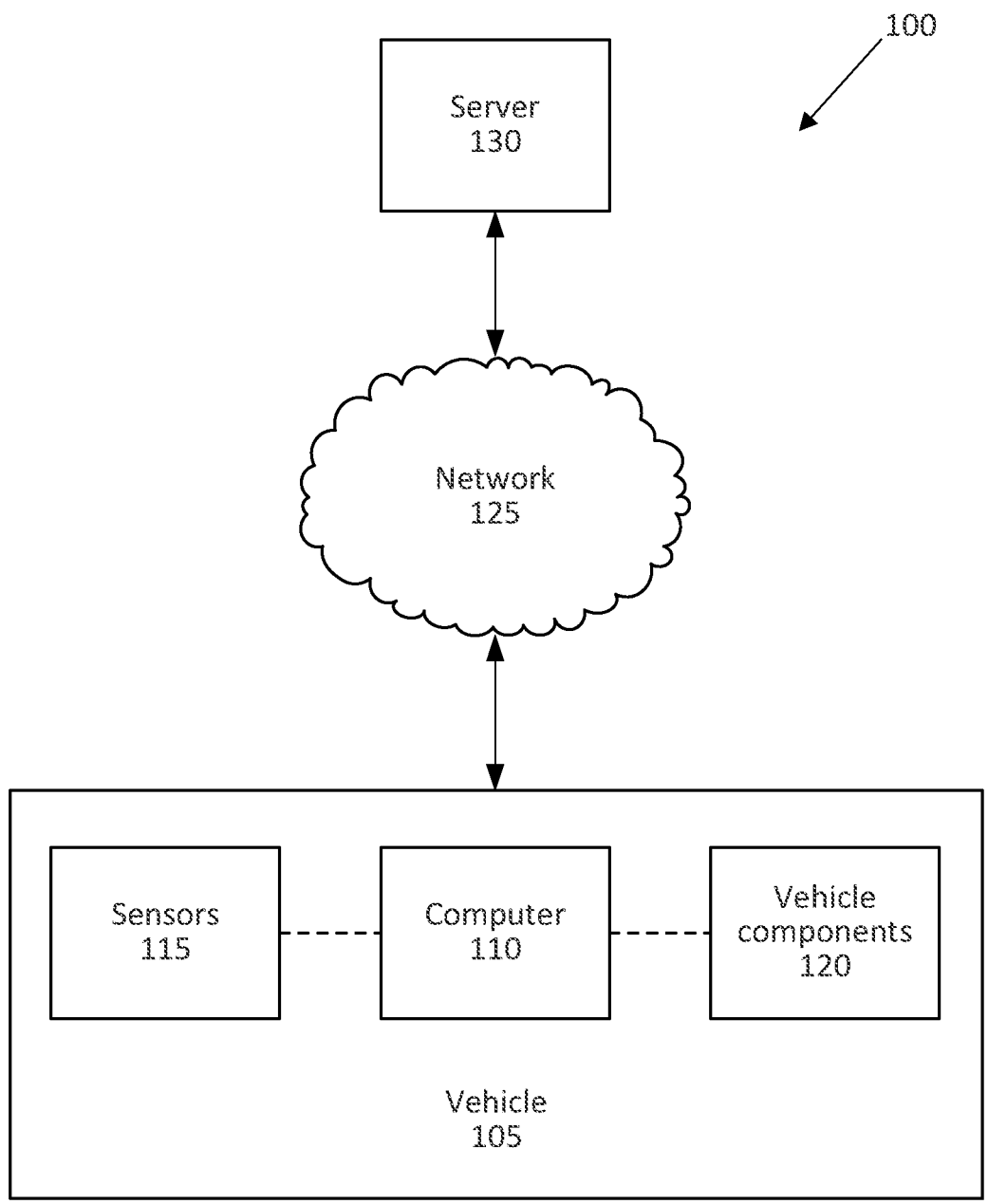
FIG. 1 is a block diagram of an example system for operating a vehicle.

A system includes a strut assembly including a leadscrew, a strut movable along the leadscrew upon rotation of the leadscrew, a camber angle of a wheel changeable according to movement of the strut along the leadscrew, and a motor drivably connected to the leadscrew, the motor disposed transverse to the leadscrew. The system further includes a computer including a processor and a memory, the memory storing instructions executable by the processor to predict a side slip angle of the wheel based on a wheel speed, a powertrain output, and a steering wheel angle, the side slip angle being an angle between a direction of travel of the wheel and a longitudinal axis of the wheel, upon determining that a magnitude of the predicted side slip angle exceeds a threshold, specify a prescribed camber angle of the wheel and a prescribed toe angle of the wheel, a prescribed brake pressure, and a prescribed powertrain output to reduce the magnitude of the predicted side slip angle below the threshold, actuate the motor to rotate the leadscrew to move the wheel to the prescribed camber angle, adjust a tie rod to which the wheel is mounted to move the wheel to the prescribed toe angle, actuate a brake to provide the prescribed brake pressure, and actuate a powertrain to provide the prescribed powertrain output.

The instructions can further include instructions to specify respective prescribed camber angles and respective prescribed toe angles for each of a plurality of wheels upon determining that the magnitude of the predicted side slip angle of the wheel exceeds the threshold.

Each of the plurality of wheels can include a respective strut assembly including a respective motor, and the instructions can further include instructions to actuate each motor to move each of the plurality of wheels to the respective prescribed camber angle.

The instructions further include instructions to, upon determining that the predicted side slip angle is a positive value that exceeds a positive threshold, specify the prescribed camber angle of a front wheel to a camber angle greater than a current camber angle of the front wheel and to specify the prescribed camber angle of a rear wheel to a camber angle less than a current camber angle of the rear wheel.

The instructions can further include instructions to, upon determining that the predicted side slip angle is a negative value that is below a negative threshold, specify the prescribed camber angle of a front wheel to a camber angle less than a current camber angle of the front wheel and to specify the prescribed camber angle of a rear wheel to a camber angle greater than a current camber angle of the rear wheel.

The instructions can further include instructions to predict a pitch angle of a vehicle and to specify the prescribed camber angle of the wheel based on the pitch angle.

The instructions can further include instructions to predict a roll angle of a vehicle and to specify the prescribed camber angle of the wheel based on the roll angle.

The instructions can further include instructions to specify the prescribed camber angle of the wheel based on a steering wheel angle.

The instructions can further include instructions to predict the side slip angle based on a vehicle yaw rate.

The instructions can further include instructions to specify the prescribed camber angle of the wheel based on a current vehicle operation mode.

An assembly includes a leadscrew defining a central axis, a strut movable along the leadscrew upon rotation of the leadscrew, a camber angle of a wheel changeable according to movement of the strut along the leadscrew, and a motor drivably connected to the leadscrew, the motor defining a motor axis; wherein the central axis of the leadscrew is transverse to the motor axis.

The strut can include a housing and a rod supported by the housing, and the housing can be supported by the leadscrew.

The housing can include threads engaging the leadscrew.

The threads can be arranged to move the housing along the leadscrew.

The assembly can further include a worm gear connecting the motor to the leadscrew, wherein the worm gear can transfer rotational motion of the motor about the motor axis to rotational motion of the leadscrew about the central axis.

A method includes predicting a side slip angle of a wheel based on a wheel speed, a powertrain output, and a steering wheel angle, the side slip angle being an angle between a direction of travel of the wheel and a longitudinal axis of the wheel, upon determining that a magnitude of the predicted side slip angle exceeds a threshold, specifying a prescribed camber angle of the wheel and a prescribed toe angle of the wheel, a prescribed brake pressure, and a prescribed powertrain output to reduce the magnitude of the predicted side slip angle below the threshold, actuating a strut assembly to move the wheel to the prescribed camber angle, adjusting a tie rod to which the wheel is mounted to move the wheel to the prescribed toe angle, actuating a brake to provide the prescribed brake pressure, and actuating a powertrain to provide the prescribed powertrain output.

The method can further include specifying respective prescribed camber angles and respective prescribed toe angles for each of a plurality of wheels upon determining that the magnitude of the predicted side slip angle of the wheel exceeds the threshold.

Each of the plurality of wheels can include a respective strut assembly including a respective motor, and the method can further include actuating each motor to move each of the plurality of wheels to the respective prescribed camber angle.

The method can further include, upon determining that the predicted side slip angle is a positive value that exceeds a positive threshold, specifying the prescribed camber angle of a front wheel to a camber angle greater than a current camber angle of the front wheel and specifying the prescribed camber angle of a rear wheel to a camber angle less than a current camber angle of the rear wheel.

The method can further include, upon determining that the predicted side slip angle is a negative value that is below a negative threshold, specifying the prescribed camber angle of a front wheel to a camber angle less than a current camber angle of the front wheel and specifying the prescribed camber angle of a rear wheel to a camber angle greater than a current camber angle of the rear wheel.

The method can further include predicting a pitch angle of a vehicle and specifying the prescribed camber angle of the wheel based on the pitch angle.

The method can further include predicting a roll angle of a vehicle and specifying the prescribed camber angle of the wheel based on the roll angle.

The method can further include specifying the prescribed camber angle of the wheel based on a steering wheel angle.

The method can further include predicting the side slip angle based on a vehicle yaw rate.

The method can further include specifying the prescribed camber angle of the wheel based on a current vehicle operation mode.

Contact between a tire of a wheel and a roadway creates a contact path where the tire grips the roadway. An angle defined between the tire and the roadway (e.g., a camber angle) can reduce the contact patch, increasing shear forces on the tire. Changing a camber angle and a toe angle of the wheel adjusts contact of the tire with the roadway, which can improve handling of a vehicle in a turn while increasing wear on the tire from uneven distribution of a surface of the tire on the roadway. Determining a camber angle and a toe angle for the wheel can require selection from competing design choices, weighing improving handling at the cost of increased wear on the tire. Manually changing the camber angle and the toe angle can be time-consuming and difficult, e.g., requiring disassembly of a strut and installation of additional components (e.g., camber plates) for each adjustment to the camber angle. The camber plates may be costly and difficult to install.

A user can provide input to a computer which actuates a strut mount to change the camber angle and an axle to change the toe angle without disassembly of the vehicle, easing adjustment of the camber angle and the toe angle. Adjusting the camber angle and the toe angle with the computer reduces overall wear on the tire by returning the camber angle and the toe angle to evenly distribute the surface of the tire on the roadway when the improved handling is no longer required.

The user can provide input regarding an operation mode of the vehicle to the computer. An operation mode can include settings for vehicle components, e.g., traction control, stability control, throttle response, shock absorber damping, etc. Each operation mode adjusts the components for a particular type of driving, e.g., conventional roadway driving, racetrack driving, fuel-saving driving, etc. The computer can associate a camber angle and a toe angle with each operation mode based on the type of driving associated with the operation mode.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle systems and components, e.g., a vehicle velocity, a vehicle trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, a vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2B:
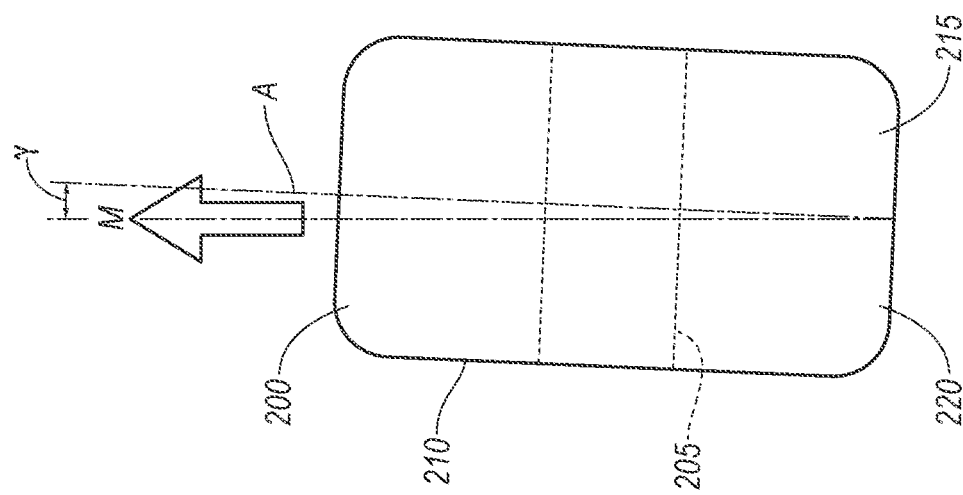
FIGS. 2A-2B are top-down views of an example wheel defining a side slip angle.
Figure 2A:
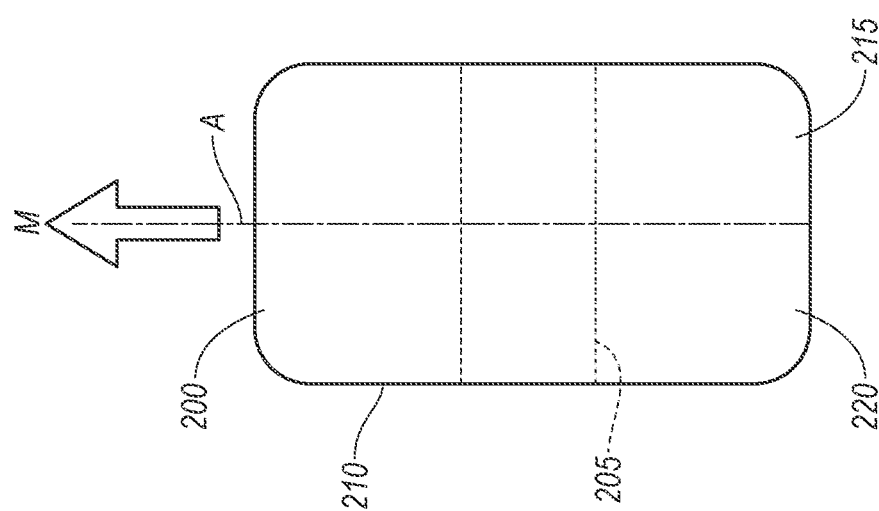

FIGS. 2A-2B are top-down views of a wheel 200 of a vehicle 105. The wheel 200 defines a longitudinal axis A and a direction of motion M. In the views shown in FIGS. 2A-2B, the wheel 200 moves forward, i.e., the direction of motion M is the direction that the vehicle 105 moves in a "drive" transmission gear. When the wheel 200 does not slip along a roadway surface, the wheel 200 moves along the longitudinal axis A, i.e., the longitudinal axis A and the direction of motion M are aligned, as shown in FIG. 2A. When traction on the roadway surface is poor, the wheel 200 may slip along the roadway surface, and the direction of motion M may divert from the longitudinal axis A. The longitudinal axis A and the direction of motion M define a "side slip angle" γ therebetween. The side slip angle γ is an angle between a line extending along the longitudinal axis A of the wheel 200 and a line extending along the direction of motion M. The side slip angle γ describes slipping of the wheel 200 away from an intended direction of travel, causing the vehicle 105 to move away from a path intended by an operator. Reducing the side slip angle γ improves stability of operation of the vehicle 105. The side slip angle γ is oriented such that when the direction of motion M is counterclockwise relative to the longitudinal axis A, as shown in FIG. 2B, the side slip angle γ is negative. When the direction of motion M is clockwise relative to the longitudinal axis A, not shown in the Figures, the side slip angle γ is positive.

Figure 6A:
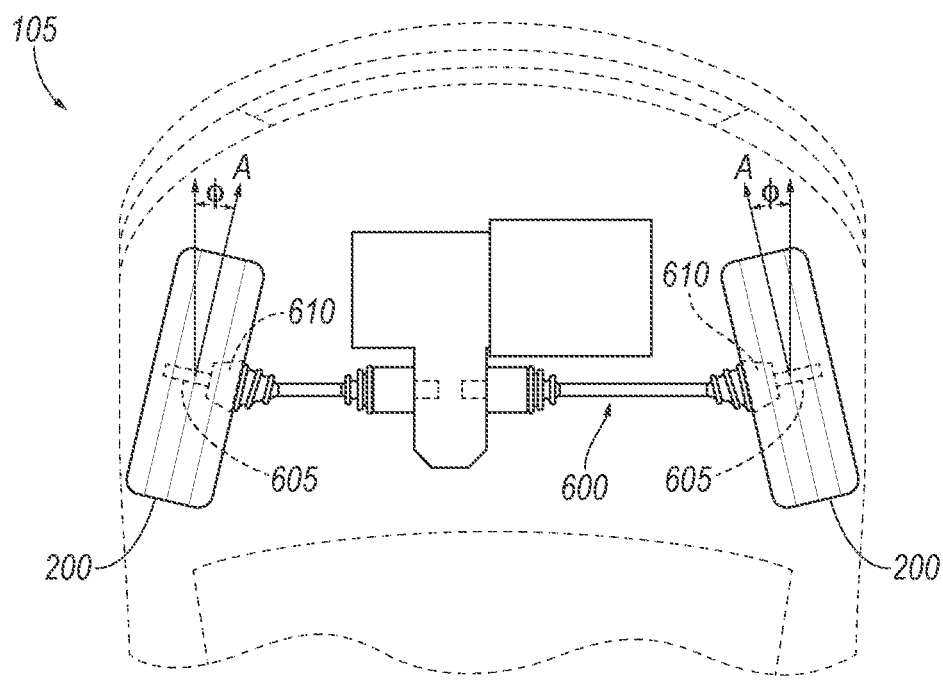
FIGS. 6A-6B are top-down views of an example axle of the vehicle.
Figure 6B:
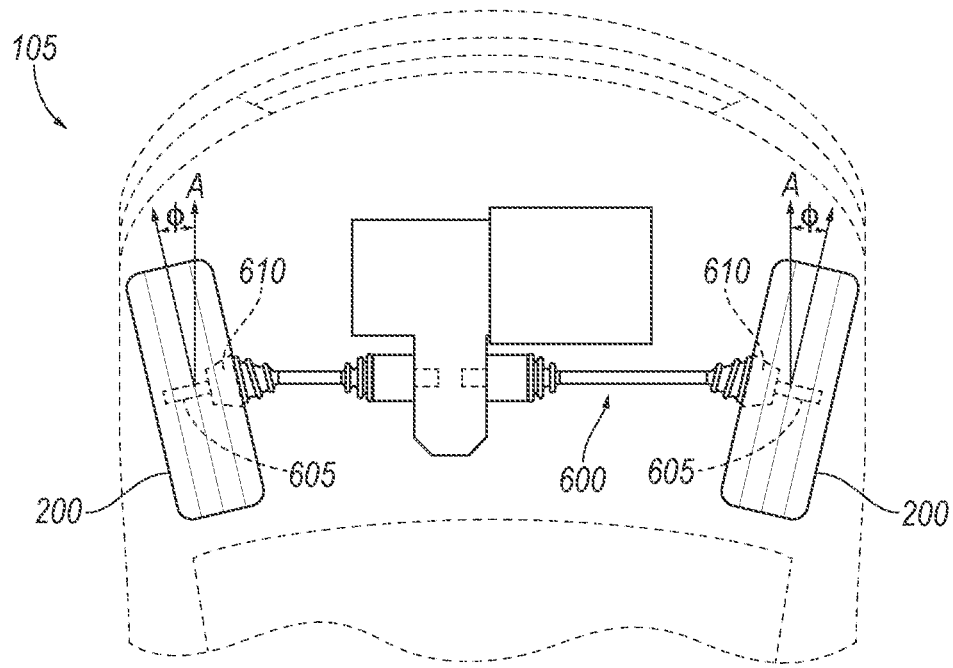

Each of the wheels 200 of the vehicle 105 can have a respective side slip angle γ. Based on the magnitude and sign of the side slip angle γ for each wheel 200, the vehicle 105 can enter an "oversteer" status or an "understeer" status. In the oversteer status, the wheels 200 steer the vehicle 105 more than intended by operator input to a steering wheel. Front wheels 200 having greater negative side slip angles γ than rear wheels 200 can lead to the oversteer status. In the understeer status, the wheels 200 steer the vehicle 105 less than intended by operator input to the steering wheel. Front wheels 200 having greater positive side slip angles γ than rear wheels 200 can lead to the understeer status. Adjusting positions of the wheels 200 relative to the roadway surface can reduce the side slip angles γ, reducing oversteer and understeer statuses. For example, adjusting a camber angle θ of the wheel 200, as shown in FIGS. 4A-4B, can reduce the side slip angle γ of the wheel 200. In another example, adjusting a toe angle φ of the wheel 200, as shown in FIGS. 6A-6B, can reduce the side slip angle γ of the wheel 200.

The wheel 200 includes a hub 205 and a tire 210. The hub 205 connects the tire 210 to the body of the vehicle 105, e.g., to a suspension as described below. The tire 210 grips the roadway, and friction between the tire 210 and the roadway moves the vehicle 105. The tire 210 has an inboard portion 215 and an outboard portion 220. In a turn, the hub 205 can press one of the inboard portion 215 or the outboard portion 220 of the tire 210 into the roadway, increasing contact with the roadway. The hub 205 can reduce pressure on the other of the inboard portion 215 and the outboard portion 220, decreasing contact with the roadway. For example, in a right turn, the inboard portion 215 of the tire 210 of FIGS. 2A-2B may increase contact with the roadway and the outboard portion 220 may decrease contact with the roadway.

Figure 3:
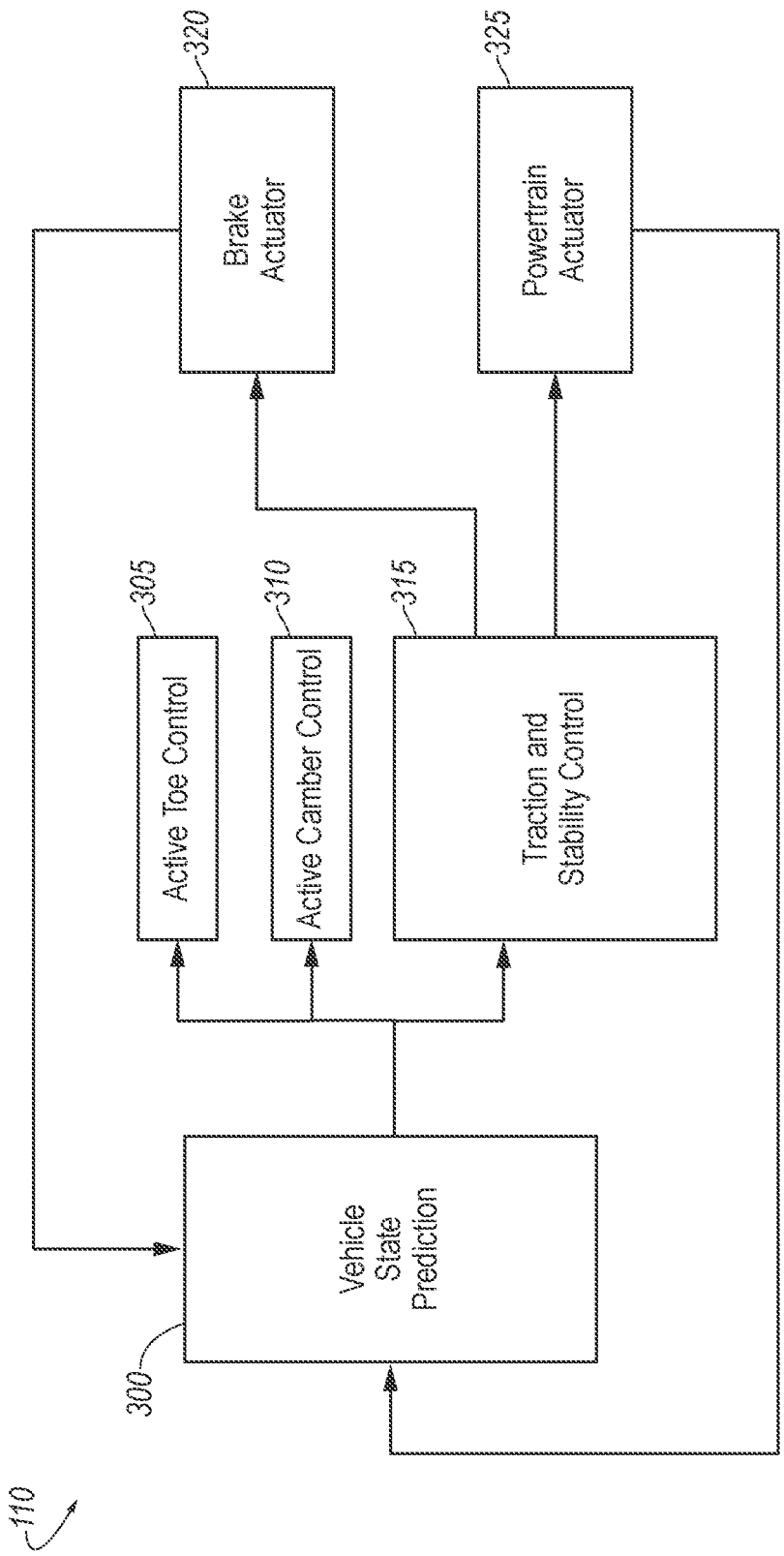
FIG. 3 is a block diagram of a computer of the vehicle predicting the side slip angle.

FIG. 3 is a block diagram of the computer 110 operating the vehicle 105 based on a predicted side slip angle γ. The side slip angle γ may be difficult to measure directly, and the computer 110 can predict a side slip angle γ of the wheel with a vehicle state prediction program 300. The vehicle state prediction program 300 uses operation data from one or more components 120 to predict the side slip angle γ. The "operation data" are data describing a state or condition of the component 120. Example operation data include, e.g., vehicle speed, vehicle acceleration, powertrain output, steering wheel angle, throttle position, air/fuel ratio, brake pressure, exhaust oxygen concentration, etc. The state prediction program 300 receives as input at least one of a wheel speed, a powertrain output, a steering wheel angle, and a throttle position. The vehicle state prediction program 300 can predict the side slip angle γ by, e.g., integration of acceleration, speed, and heading angle over a specified time period, a linear bicycle model, a double-track model, etc.

When a magnitude of the predicted side slip angle γ exceeds a threshold, the computer 110 can specify at least one of a prescribed camber angle θ of the wheel 200, a prescribed toe angle φ of the wheel 200, a prescribed brake pressure, and a prescribed powertrain output to reduce the magnitude of the predicted side slip angle below the threshold. The threshold can be determined based on empirical testing of test vehicles 105 on test roadways and side slip angles $\gamma$ in a test turn. The threshold can be a maximum side slip angle $\gamma$ for which the test vehicle 105 completes the test turn without crossing over a lane boundary.

The vehicle state prediction program 300 can output the prescribed toe angle $\phi$ to an active toe control program 305. The active toe control program 305 can adjust the toe angle $\phi$ of the wheel 200 to reduce the side slip angle $\gamma$, as shown in FIGS. 6A-6B below. The vehicle state prediction program 300 can output the prescribed camber angle $\theta$ to an active camber control program 310. The active camber control program 310 can adjust the camber angle $\theta$ of the wheel 200 to reduce the side slip angle $\gamma$, as shown in FIGS. 4A-5B below. The vehicle state prediction program 300 can output the prescribe brake pressure and the prescribed powertrain output to a traction and stability control program 315. The traction and stability control program 315 is programming of the computer 110 that provides instructions to a brake actuator 320 and/or a powertrain actuator 325 to actuate a brake and/or a powertrain to reduce the side slip angle $\gamma$. The vehicle state prediction program 300 can specify respective prescribed camber angles $\theta$ and respective prescribed toe angles $\phi$ for each of a plurality of wheels 200. The traction control program 315 can be stored in the memory of the computer 110; alternatively or additionally, the traction and stability control program 315 can be stored in a dedicated electronic control unit (ECU) or other computer hardware.

The traction and stability control program 315 can provide instructions to a brake actuator 320 to actuate a brake to provide the prescribed brake pressure. As described above, the vehicle state prediction program 300 can output a prescribed brake pressure to slow the vehicle 105 in the turn to reduce the side slip angle $\gamma$ and/or create yaw moments to reduce oversteer and understeer, described below. The brake actuator 320 can actuate one or more brake valves to provide brake fluid to a brake pad at the specified brake pressure. The brake actuator 320 can provide the current brake pressure to the vehicle state prediction program 300, and the vehicle state prediction program 300 can predict a new side slip angle $\gamma$ based on the brake pressure provided by the brake actuator 320.

The traction and stability control program 315 can provide instructions to a powertrain actuator 325 to actuate a powertrain to provide the prescribed powertrain output. As described above, the vehicle state prediction program 300 can output a prescribed powertrain output to reduce the side slip angle $\gamma$. The powertrain actuator can actuate a propulsion to provide a specified torque output from the powertrain. For example, the powertrain actuator can adjust a throttle position to reduce output from the propulsion. In another example, the powertrain actuator can adjust a transmission to a lower gear than a current gear. In yet another example, the powertrain actuator can reduce a fuel volume provided by a fuel injector to a cylinder in the propulsion. The powertrain actuator 325 can provide the current throttle position to the vehicle state prediction program 300, and the vehicle state prediction program 300 can predict a new side slip angle $\gamma$ based on the throttle position provided by the powertrain actuator 325.

The vehicle state prediction program 300 can specify the camber angles $\theta$ and the toe angles $\phi$ based on a sign of the side slip angle $\gamma$, i.e., whether the side slip angle $\gamma$ is positive or negative. When the predicted side slip angle $\gamma$ is a positive value that exceeds a positive threshold, the vehicle state prediction program 300 can specify the prescribed camber angle $\theta_f$ of a front wheel 200 to a camber angle $\theta$ less than a current camber angle $\theta$ of the front wheel 200 and the prescribed camber angle $\theta_r$ of a rear wheel 200 to a camber angle $\theta$ greater than a current camber angle $\theta$ of the rear wheel 200. When the side slip angle $\gamma$ is positive, the vehicle 105 can be in an understeer condition, as described above. When the predicted side slip angle $\gamma$ is a negative value that is below a negative threshold, the vehicle state prediction program 300 can specify the prescribed camber angle $\theta_f$ of a front wheel 200 to a camber angle $\theta$ greater than a current camber angle $\theta$ and to specify the prescribed camber angle $\theta_r$ of a rear wheel 200 to a camber angle $\theta$ less than a current camber angle $\theta$. When the side slip angle $\gamma$ is negative, the vehicle 105 can be in an oversteer condition, as described above.

The vehicle state prediction program 300 can predict a pitch angle and a roll angle of the vehicle 105. The "pitch" angle is an angle defined between front and rear axles of the vehicle 105 based on a height difference between the front and rear axles. The "roll" angle is an angle defined between a left side and a right side of the vehicle 105 based on a height difference between the left and right sides of the vehicle 105. In a turn, the pitch and roll angles may change, causing portions of the wheel 200 to increase contact with the roadway and increasing wear on the tire 210. The vehicle state prediction program 300 can predict the pitch and roll angle of the vehicle 105 for an upcoming turn based on, e.g., the double-track kinematics model described above. For example, in a left turn, the right side of the vehicle 105 may rise above the left side of the vehicle 105, increasing a roll angle of the vehicle 105 and decreasing contact of the tires 210 of the right wheels 200 with the roadway. The decreased contact of the tires 210 can increase a side slip angle $\gamma$ of the right wheels 200. The vehicle state prediction program 300 can predict the side slip angle $\gamma$ based on the predicted roll angle during the left turn and can specify camber angles $\theta$ for the wheels 200 to reduce the side slip angle $\gamma$.

The vehicle state prediction program 300 can predict the side slip angle $\gamma$ based on a steering wheel angle of a steering wheel of the vehicle 105. The "steering wheel angle" is an angle that the steering wheel is rotated relative to a neutral position. The steering wheel rotates the wheels 200 relative to turn the vehicle 105, and when the vehicle 105 turns, portions of the tire 210 may increase or decrease contact with the roadway. As described above, the increased or decreased contact can lead to the wheel 200 slipping, defining a side slip angle $\gamma$. The vehicle state prediction program 300 can predict the side slip angle $\gamma$ based on the steering wheel angle and resulting orientation of the wheels 200. For example, the vehicle state prediction program 300 can use a steering model that outputs a steering angle between each wheel 200 and a longitudinal axis of the vehicle 105 based on the steering wheel angle and a steering ratio between the steering wheel and the axle. Based on the steering angle, the vehicle state prediction program 300 can predict whether portions of the tire 210 would increase or decrease contact with the roadway and the resulting side slip angle $\gamma$ from the change in contact. Based on the side slip angle $\gamma$, the vehicle state prediction program 300 can determine the prescribed camber angle $\theta$ and the prescribed toe angle $\phi$ of each wheel 200.

The vehicle state prediction program 300 can specify the camber angles $\theta$ for front and rear wheels 200 and toe angles $\phi$ for front and rear wheels 200 based on the identified side slip angle $\gamma$. Example values of the specified camber and toe angles $\theta$, $\phi$ are shown in Table 1:

TABLE 1

Camber and Toe Angle Specification at Vehicle Speed of 60 kph

| Side Slip Angle $\gamma$ | Outside Front Camber $\theta_{f,o}$ | Front Toe $\phi_f$ | Inside Front Camber $\theta_{f,i}$ | Rear Toe $\phi_r$ |
|---|---|---|---|---|
| 0.0 | −2.00 | 0.00 | −2.00 | 0.00 |
| −1.0 | −2.25 | 0.50 | −1.75 | 0.00 |
| 1.0 | −1.75 | −0.50 | −2.25 | 0.00 |
| −2.0 | −2.50 | 1.00 | −1.25 | 0.00 | where the outside front camber $\theta_{f,o}$ is the camber angle $\theta$ for the front wheel outboard relative to the turning direction of the vehicle 105 and the inside front camber $\theta_{f,i}$ is the camber angle $\theta$ for the front wheel inboard relative the turning direction of the vehicle 105.

FIGS. 4A-4B illustrate an example suspension 400. The suspension 400 includes a strut 405 and a strut mount 410. The suspension 400 can include a tower cap 415 and a steering knuckle 420. The suspension 400 is attached to the wheel 200. The strut 405 connects the strut mount 410 to the steering knuckle 420. The strut 405 is connected to the wheel 200 via the steering knuckle 420.

The suspension 400 includes the strut 405. The strut 405 includes a strut body 425 and a shock absorber 430. The strut body 425 connects the shock absorber 430 to the steering knuckle 420. The strut body 425 supports the shock absorber 430.

The strut 405 can include the shock absorber 430. The shock absorber 430 can be, e.g., a passive shock absorber that absorbs vibrations without additional input to the passive shock absorber, a semi-active shock absorber that includes an additional component (e.g., a fluid valve, a controller, etc.) that actively controls at least one portion of the semi-active shock absorber nut does not add additional energy to absorb the vibrations, an active shock absorber that includes an additional component that introduces an energy-absorbing medium to reduce vibrations, etc. For example, the shock absorber 430 can be a twin-tube shock absorber with a magnetorheological fluid. The shock absorber 430 can include an electromagnet (not shown). The computer 110 can actuate the electromagnet to increase a viscosity of the magnetorheological fluid, adjusting the shock absorbing capacity of the shock absorber 430. The computer 110 can actuate the electromagnet to a specified setting to adjust the shock absorber 430 to a specific viscosity.

The suspension 400 can include the tower cap 415. The tower cap 415 connects the strut mount 410 to the body of the vehicle 105. The tower cap 415 can secure the strut mount 410 to the body.

The suspension 400 can include the steering knuckle 420. The steering knuckle 420 connects the shock absorber 430 to the wheel 200. The steering knuckle 420 can be connected to a steering rack (not shown). The steering knuckle 420 can transmit movement of the steering rack to the wheel 200, turning the wheel 200 to steer the vehicle 105.

The wheel 200 includes the hub 205 and the tire 210, as described above. The hub 205 connects the steering knuckle 420 to the tire 210. The steering knuckle 420 can transmit movement of a steering rack to the hub 205, turning the wheel 200 to steer the vehicle 105. The tire 210 contacts a roadway, moving the vehicle 105 along the roadway.

The wheel 200 defines a camber angle $\theta$ relative to a vertical axis Z. FIG. 4A shows an example camber angle $\theta$ of substantially −1°, which can correspond to a "normal" operating mode, as described below. FIG. 4B shows a camber angle $\theta$ of substantially −2.5°, which can correspond to a "track" operating mode, as described below. When the camber angle $\theta$ directs the wheel 200 toward the strut 405 (i.e., in an inboard direction of the vehicle 101) the camber angle $\theta$ is negative. When the camber angle $\theta$ directs the wheel 200 away from the strut 405 (i.e., in an outboard direction of the vehicle 105), the camber angle $\theta$ is positive. When the camber angle $\theta$ is near zero, e.g., −1°, substantially all of an outer surface of the tire contacts the roadway, evenly distributing contact along the outer surface. When the camber angle $\theta$ is greater than zero, portions of the tire can have more contact with the roadway than other portions, which can improve operation of the vehicle 101 in a turn. For example, as shown in FIG. 4, when the camber angle $\theta$ is substantially −2.5°, an outward portion of the tire can have decreased contact with the roadway and an inward portion of the tire can have increased contact with the roadway, improving turning of the vehicle 105.

Figures 5A, 5B:
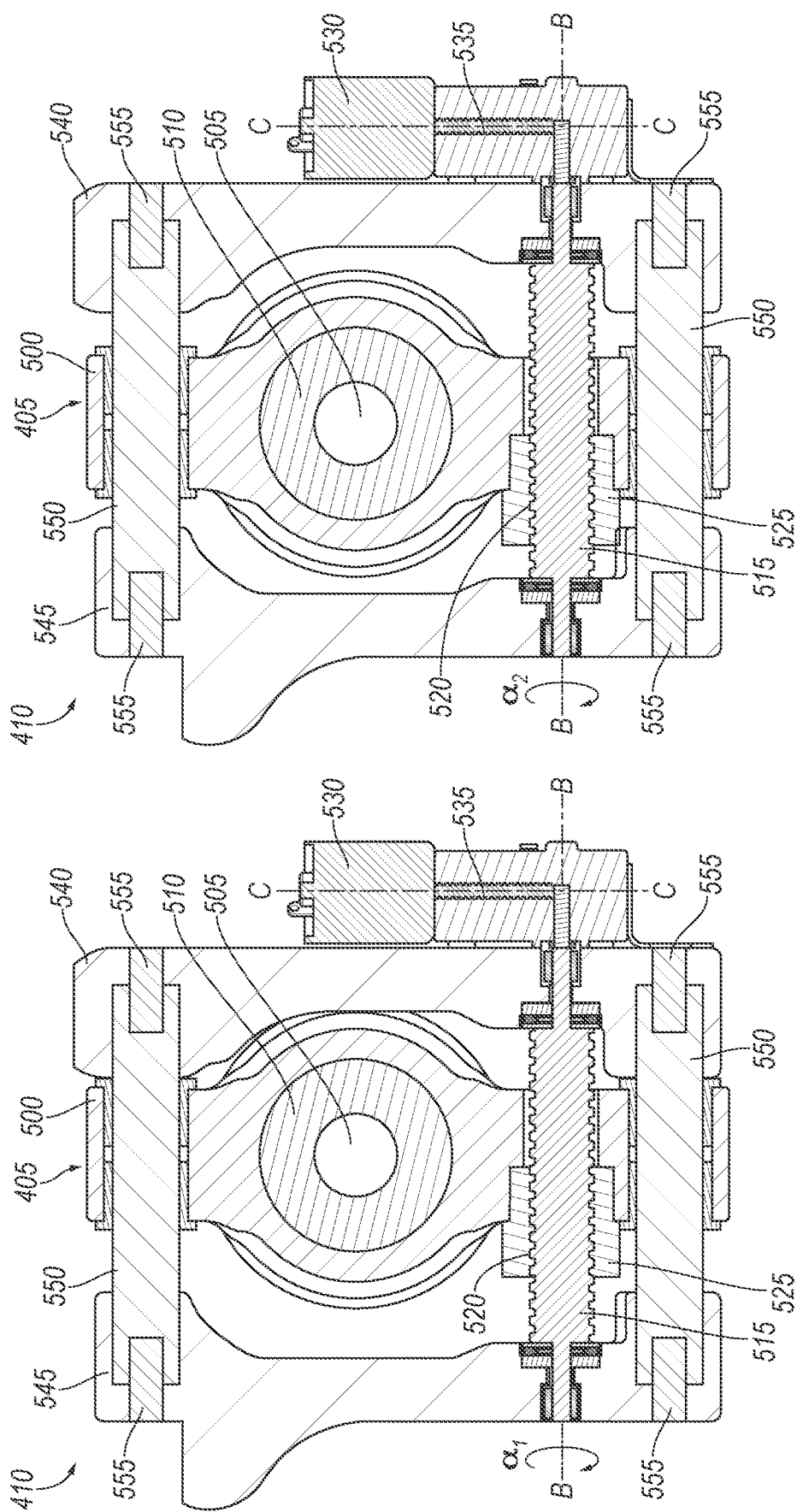
FIGS. 5A-5B are top-down views of an example strut and strut mount.

FIG. 5A-5B show a top-down view of an example strut 405 and an example strut mount 410. The strut mount 410 supports the strut 405. The strut mount 410 moves the strut 405 to adjust the camber angle $\theta$ of the wheel 200. For example, the strut mount 410 can move the strut 405 from a first position, as shown in FIG. 5A, to a second position, as shown in FIG. 5B. The strut mount 410 is connected to the vehicle body (not shown).

The strut 405 includes a housing 500. The housing 500 is supported by the strut mount 410. The housing 500 is movable along the strut mount 410. The position of the housing 500 along the strut mount 410 corresponds to a specific camber angle $\theta$ of the wheel 200, as described below. The strut 405 includes a rod 505. The rod 505 is supported by the housing 500. The rod 505 is connected to the wheel 200 via the shock absorber 430, the strut body 425, and the steering knuckle 420. As the housing 500 moves along the strut mount 410, the rod 505 moves the wheel 200 to the specified camber angle $\theta$.

The housing 500 includes a bearing 510. The bearing 510 supports the rod 505. The bearing 510 can be, e.g., a spherical bearing, a bushing, etc. When the bearing 510 is a spherical bearing, the bearing 510 can include a substantially spherical roller. When the bearing 510 is a bushing, the bearing 510 can be, e.g., rubber, polyurethane, Teflon®, nylon, etc. The bearing 510 allows the rod 505 to pivot relative to the housing 500. When the housing 500 moves, the housing 500 pushes on the bearing 510, pivoting the rod 505.

The strut mount 410 includes a leadscrew 515. The leadscrew 515 can be, e.g., a threaded rod. The leadscrew 515 defines a central axis B. The housing 500 includes threads 520 that engage the leadscrew 515. For example, as shown in FIG. 5B, the housing 500 can include a threaded nut 525 that includes threads 520. The threads 520 mate with corresponding threads of the leadscrew 515. The threads 520 are arranged to move the housing 500 along the leadscrew 515. As the leadscrew 515 rotates, the leadscrew 515 pushes on the threads 520, moving the threaded nut 525 axially along the leadscrew 515. The threaded nut 525 moves the housing 500 along the leadscrew 515, and the housing 500 moves the rod 505, which moves the wheel 200 to a specified camber angle $\theta$. Thus, rotation of the leadscrew 515 corresponds to movement of the wheel 200 to a specified camber angle $\theta$.

The strut mount 410 includes a motor 530 and a rotating shaft 535. The motor 530 rotates the rotating shaft 535 to rotate the leadscrew 515. The motor 530 is thus drivably connected to the leadscrew 515. The rotating shaft 535 can rotate the leadscrew 515 with, e.g., a worm gear. That is, the rotating shaft 535 can include threads that engage threads of the leadscrew 515 to rotate the leadscrew 515. The rotating shaft 535, as a worm gear, can transfer rotational motion of the motor 530 to rotational motion of the leadscrew 515.

The motor 530 defines a motor axis C. The rotating shaft 535 rotates about the motor axis C. The motor 530 is disposed transverse to the leadscrew 515, and the motor axis C is transverse to the central axis B. Because the motor axis C is transverse to the central axis B, the motor 530 can be arranged on the strut mount 410 to account for space constraints in the suspension 400. That is, the motor 530 can be arranged substantially perpendicular to the leadscrew 515 to minimize extension of the motor 530 away from the strut mount 410, reducing extension of the suspension 400 into other areas of the vehicle 105. The computer 110 actuates the motor 530 to rotate the leadscrew 515. The motor 530 can be, e.g., a brushless DC electric motor, an AC motor, etc.

Each wheel 200 can include a respective strut 405 and strut mount 410. The computer 110 can actuate a respective motor 530 to move each wheel 200 to a specified camber angle θ. The computer 110 can move each wheel 200 to a different camber angle θ based on a turn direction of the vehicle 105. For example, when the vehicle is turning to the right, the computer 110 can adjust the camber angles θ of the right wheels 200 to a smaller camber angle θ than the camber angles θ of the left wheels 200 because the left wheels 200 may have less contact with the roadway during the right turn. Providing a larger camber angle θ to the left wheels 200 can increase contact between tires 210 of the left wheels 200, reducing wear on the tires 210.

The strut mount 410 includes a first end carrier 540, a second end carrier 545, and connecting rods 550 extending from the first end carrier 540 to the second end carrier 545. The leadscrew 515 extends between the first end carrier 540 and the second end carrier 545. The first end carrier 540 and the second end carrier 545 support the leadscrew 515. The connecting rods 550 support the housing 500. The housing 500 moves along the connecting rods 550 between the first end carrier 540 and the second end carrier 545. The connecting rods 550 are mounted to the end carriers 540, 545 with fasteners 555, e.g., dowels, pins, screws, bolts, etc.

The computer 110 receives user input specifying an operation mode. An "operation mode" in the present context is a set of settings for one or more vehicle components 120 where the settings together provide specific driving characteristics for the vehicle 105. The user can provide input to a human-machine interface (HMI) (not shown), e.g., a touchscreen, a button, a lever, a rotating dial, etc. Upon receiving the user input, the computer 110 can actuate components 120 to settings associated with the operation mode, e.g., a camber angle θ, a shock absorber stiffness, a steering assist stiffness, etc. The operation modes are determined by a manufacturer and are stored in the memory of the computer 110.

The operation mode can include a specified camber angle θ. As described above, the camber angle θ can adjust contact of the tire 210 with the roadway, affecting turning of the vehicle 105. In a "track" operation mode, the computer 110 can adjust the camber angle θ to a specified value to improve handling of the vehicle 105 turning around a corner, e.g., −1.75°, −2.5°, −3.1°, etc. In a "normal" operation mode, the computer 110 can adjust the camber angle θ to a lower value, e.g., 0°, −1°, etc., than the camber angle θ associated with the "track" operation mode to reduce wear on the tire 210.

The operation mode can include a specified shock absorber setting. As described above, the computer 110 can actuate components 120 to adjust shock absorbing characteristics of the shock absorber 430. For example, the computer 110 can actuate an electromagnet to a specified voltage to increase a viscosity of a magnetorheological fluid in the shock absorber 430, increasing absorption of vibrations by the shock absorber 430. In another example, the computer 110 can actuate a solenoid fluid valve to a specified opening size to move hydraulic fluid into or out from a shock absorber. The settings can be determined by a manufacturer and stored in the memory of the computer 110.

When the user provides input for a specific operation mode, the computer 110 can move the wheel 200 to the camber angle θ associated with the operation mode. The computer 110 can actuate the motor 530 to rotate the leadscrew 515 to a specified rotation angle α, moving the housing 500 along the leadscrew 515. The specified rotation angle α corresponds to a position of the housing 500 along the leadscrew 515, as described below. The housing 500 moves the rod 505, which moves the steering knuckle 420 and the wheel 200 to the specified camber angle θ. Thus, the computer 110 moves the strut 405 along the leadscrew 515 to provide the camber angle θ associated with the operation mode.

The motor 530 rotates the leadscrew 515 to a specified rotation angle α. The "rotation angle" α is the angle of rotation of the leadscrew 515. The motor 530 can include a rotation sensor 115 that collects data of the rotation angle α. Because the rotating shaft 535 is transverse to the leadscrew 515, the leadscrew 515 rotates to the rotation angle α based on a ratio between threads of the leadscrew 515 and threads of the rotating shaft 535. For example, the thread ratio can be 1:1, i.e., rotation of the rotating shaft 535 to the rotation angle α rotates the leadscrew 515 to the same rotation angle α.

The computer 110 can actuate the motor 530 to rotate the rotating shaft 535, rotating the leadscrew 515 to a specified rotation angle α to provide a camber angle θ associated with the selected operation mode. For example, the computer 110 can actuate the motor 530 to rotate the leadscrew 515 to the rotation angle $\alpha_1$ to provide a camber angle θ of −1° associated with a "normal" operation mode, as shown in FIG. 5A. In another example, the computer 110 can actuate the motor 530 to rotate the leadscrew 515 to the rotation angle $\alpha_2$ to provide a camber angle θ of −2.5° associated with a "track" operation mode, as shown in FIG. 5B. The rotation angle α corresponding to the camber angle θ can be determined based on, e.g., empirical testing, suspension modeling, etc., and can be stored in the memory and/or the server 130. For example, the leadscrew 515 can have a predetermined spacing between threads, i.e., a thread pitch, and rotating the leadscrew 515 one rotation (i.e., 360°) moves the housing 500 along the leadscrew 515 by the predetermined spacing. The thread pitch of the leadscrew 515 can be, e.g., 1 mm, 1.5 mm, 2 mm, etc. Thus, when the motor 530 rotates the rotating shaft 535 by 360°, and the thread ratio between the rotating shaft 535 and the leadscrew 515 is 1:1, the housing 500 moves along the leadscrew 515 by the thread pitch. Empirical testing can correlate the position of the housing 500 along the leadscrew 515 to the camber angle θ, and based on the thread pitch, the computer 110 can determine the rotation angle α to move the housing 505 to the position corresponding to the camber angle θ.

The computer 110 can refer to a lookup table stored in the memory and/or the server 130. For example, for a leadscrew 515 thread pitch of 1.5 mm, the computer 110 can refer to Table 2 to determine the rotation angle α required for a specified camber angle θ.

TABLE 2

| Rotation Angle α (degrees) | Camber Angle θ (degrees) |
|---|---|
| 0 | −1.00 |
| 1200 | −1.50 |
| 1800 | −1.75 |
| 3600 | −2.50 |

FIGS. 6A-6B are top-down views of an axle 600 connecting wheels 200 of the vehicle 105. The axle 600 provides rotational input to rotate the wheels 200, moving the vehicle 105. FIGS. 6A-6B show a front axle 600 for a pair of front wheels 200, and the vehicle 105 can include a rear axle (not shown) for a pair of rear wheels 200. FIG. 6A shows the wheels 200 with positive toe angles $\phi$, i.e., pointing inboard relative to a longitudinal axis A of each wheel 200. FIG. 6B shows the wheels 200 with negative toe angles $\phi$, i.e., pointing outboard relative to the longitudinal axis A of each wheel 200.

The axle 600 includes a pair of tie rods 605. Each tie rod 605 is connected to one of the wheels 200. The tie rod 605 can move the wheel 200 to the toe angle $\phi$ prescribed by the state prediction program 300. The tie rod 605 can include an actuator 610 that moves the wheel 200 upon instruction by the computer 110. That is, the tie rod 605 is movable relative to a longitudinal axis A of the wheel 200, moving the wheel 200 to the specified toe angle $\phi$. Actuating the tie rods 605 with the actuator 610 to move the wheels 200 to the specified toe angles $\phi$ can adjust portions of the tire 210 that contact the roadway. Changing portions of the tire 210 that contact the roadway, as discussed above with reference to the camber angle $\theta$, can reduce the side slip angle $\gamma$ by increasing an amount of a surface of the tire 210 that grips the roadway, reducing slipping of the wheel 200.

Figure 7:
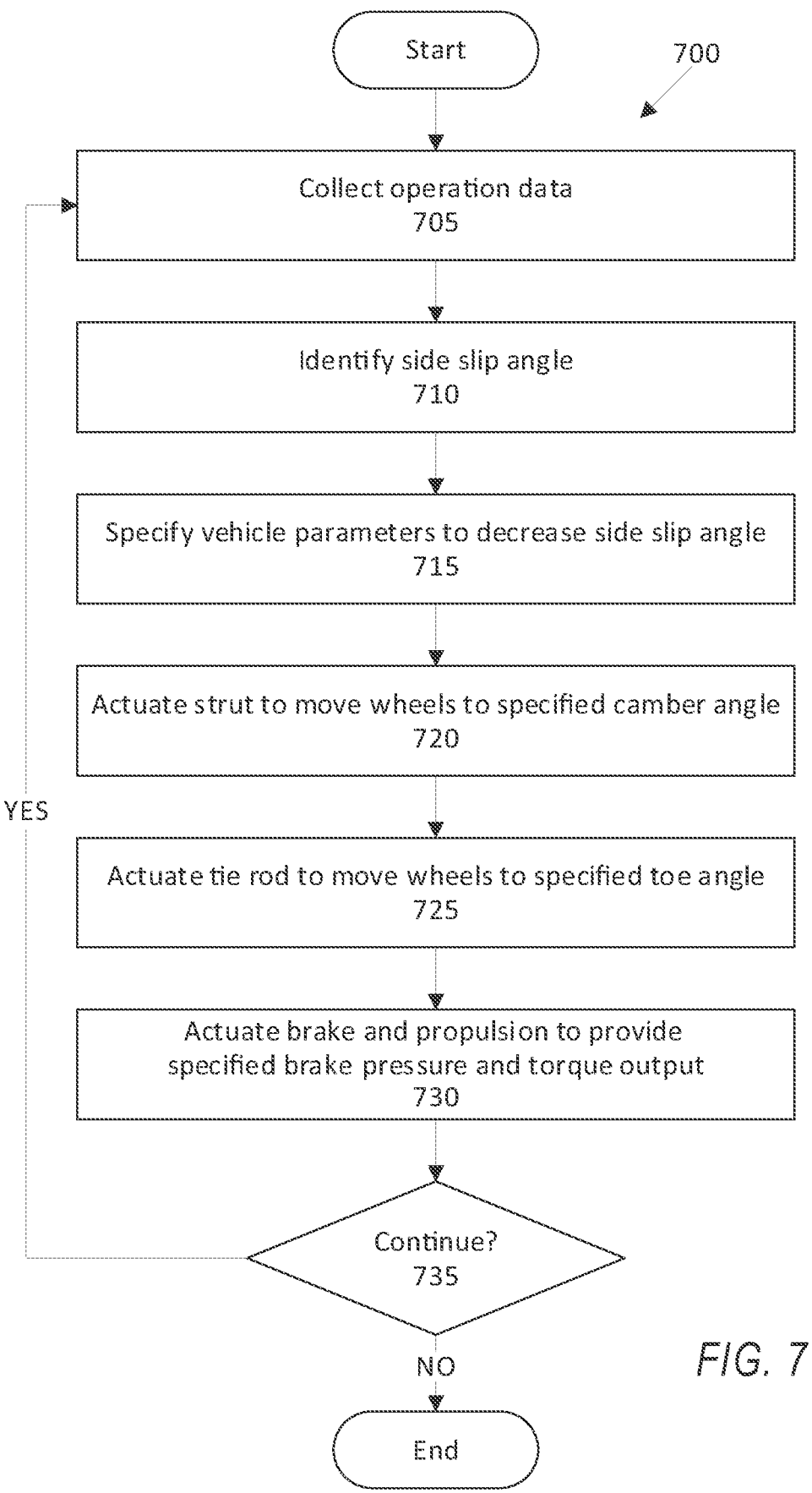
FIG. 7 is a block diagram of an example process for operating the vehicle.

FIG. 7 is a block diagram of an example process 700 for decreasing a side slip angle $\gamma$ of a vehicle 105. The process 700 begins in a block 705, in which a computer 110 collects operation data of one or more components 120. As described above, based on operation of the components 120, a wheel 200 may slip relative to its forward motion, defining a side slip angle $\gamma$. The operation data can include, e.g., a wheel speed, a powertrain output, a steering wheel angle, a throttle position, etc.

Next, in a block 710, the computer 110 identifies the side slip angle $\gamma$ for each wheel 200. As described above, the computer 110 can input the operation data to a vehicle state prediction program 300 that outputs a predicted side slip angle $\gamma$ for each wheel 200. The vehicle state prediction program 300 can predict the side slip angle $\gamma$ by, e.g., integration of acceleration, speed, and heading angle over a specified time period, a linear bicycle model, a double-track model, etc.

Next, in a block 715, the vehicle state prediction program 300 specifies one or more parameters to decrease the side slip angle $\gamma$. As described above, the vehicle state prediction program 300 can specify a camber angle $\theta$, a toe angle $\phi$, a brake pressure, and/or a powertrain output to decrease the side slip angle $\gamma$. For example, the vehicle state prediction program 300 can provide a specified toe angle $\phi$ to an active toe control program 305 that actuates a tie rod 605 to move the wheel 200 to the specified toe angle $\phi$. In another example, the vehicle state prediction program 300 can provide a specified camber angle $\theta$ to an active camber control program 310 to actuate a strut 405 to move the wheel 200 to the specified camber angle $\theta$.

Next, in a block 720, the computer 110 actuates a strut 405 to move one of the wheels 200 to the specified camber angle $\theta$. As described above, the computer 110 can actuate a motor 530 to rotate a leadscrew 515 that moves a housing 500 along the leadscrew 515, moving a strut mount 410. The movement of the strut mount 410 moves a steering knuckle 420, moving the wheel 200 to the specified camber angle $\theta$.

Next, in a block 725, the computer 110 actuates a tie rod 605 of an axle 600 to move one of the wheels 200 to the specified toe angle $\phi$. As described above, the computer 110 can provide an instruction to a tie rod actuator 610 to move the tie rod 605 relative to the axle 600 until the wheel is at the specified toe angle $\phi$.

Next, in a block 730, the computer 110 actuates a brake and a propulsion to provide the specified brake pressure and torque output from the vehicle state prediction program 300. As described above, the computer 110 can provide an instruction to the brake actuator 320 to increase or decrease an amount of brake fluid to attain the specified brake pressure. The computer 110 can provide an instruction to a powertrain actuator 325 to actuate the propulsion to increase or decrease a propulsion speed to provide the specified torque output.

Next, in a block 735, the computer 110 determines whether to continue the process 700. For example, the computer 110 can determine not to continue the process 700 when the vehicle 105 has stopped and powered off. If the computer 110 determines to continue, the process 700 returns to the block 705. Otherwise, the process 700 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising:
a strut assembly including:
  a leadscrew defining a central axis;
  a strut movable along the leadscrew upon rotation of the leadscrew, a camber angle of a wheel changeable according to movement of the strut along the leadscrew;
  a motor drivably connected to the leadscrew, the motor defining a motor axis disposed transverse to the central axis of the leadscrew; and
a computer including a processor and a memory, the memory storing instructions executable by the processor to:
  predict a side slip angle of the wheel based on a wheel speed, a powertrain output, and a steering wheel angle, the side slip angle being an angle between a direction of travel of the wheel and a longitudinal axis of the wheel;
  upon determining that a magnitude of the predicted side slip angle exceeds a threshold, specify a prescribed camber angle of the wheel and a prescribed toe angle of the wheel, a prescribed brake pressure, and a prescribed powertrain output to reduce the magnitude of the predicted side slip angle below the threshold;
  actuate the motor to rotate the leadscrew to move the wheel to the prescribed camber angle;
  adjust a tie rod to which the wheel is mounted to move the wheel to the prescribed toe angle;
  actuate a brake to provide the prescribed brake pressure; and
  actuate a powertrain to provide the prescribed powertrain output.

2. The system of claim 1, wherein the instructions further include instructions to specify respective prescribed camber angles and respective prescribed toe angles for each of a plurality of wheels upon determining that the magnitude of the predicted side slip angle of the wheel exceeds the threshold.

3. The system of claim 2, wherein each of the plurality of wheels includes a respective strut assembly including a respective motor, and the instructions further include instructions to actuate each motor to move each of the plurality of wheels to the respective prescribed camber angle.

4. The system of claim 1, wherein the instructions further include instructions to, upon determining that the predicted side slip angle is a positive value that exceeds a positive threshold, specify the prescribed camber angle of a front wheel to a camber angle greater than a current camber angle of the front wheel and to specify the prescribed camber angle of a rear wheel to a camber angle less than a current camber angle of the rear wheel.

5. The system of claim 1, wherein the instructions further include instructions to, upon determining that the predicted side slip angle is a negative value that is below a negative threshold, specify the prescribed camber angle of a front wheel to a camber angle less than a current camber angle of the front wheel and to specify the prescribed camber angle of a rear wheel to a camber angle greater than a current camber angle of the rear wheel.

6. The system of claim 1, wherein the instructions further include instructions to predict a pitch angle of a vehicle and to specify the prescribed camber angle of the wheel based on the pitch angle.

7. The system of claim 1, wherein the instructions further include instructions to predict a roll angle of a vehicle and to specify the prescribed camber angle of the wheel based on the roll angle.

8. The system of claim 1, wherein the instructions further include instructions to specify the prescribed camber angle of the wheel based on a steering wheel angle.

9. The system of claim 1, wherein the instructions further include instructions to predict the side slip angle based on a vehicle yaw rate.

10. The system of claim 1, wherein the instructions further include instructions to specify the prescribed camber angle of the wheel based on a current vehicle operation mode.

11. A strut assembly, comprising:
a strut mount including an end carrier rotationally supporting one end of a leadscrew, the leadscrew defining a central axis extending through a side surface of the end carrier;
a strut connected to the strut mount and movable along the leadscrew upon rotation of the leadscrew, a camber angle of a wheel changeable according to movement of the strut along the leadscrew; and
a motor disposed on the side surface of the end carrier and drivably connected to the leadscrew, the motor defining a motor axis parallel to the side surface,
wherein the central axis of the leadscrew is transverse to the motor axis.

12. The assembly of claim 11, wherein the strut includes a housing and a rod supported by the housing, and the housing is supported by the leadscrew.

13. The assembly of claim 12, wherein the housing includes threads engaging the leadscrew.

14. The assembly of claim 13, wherein the threads are arranged to move the housing along the leadscrew.

15. The assembly of claim 11, further comprising a worm gear connecting the motor to the leadscrew, wherein the worm gear transfers rotational motion of the motor about the motor axis to rotational motion of the leadscrew about the central axis.

16. A method performed by a processor, comprising:
predicting a side slip angle of a wheel based on a wheel speed, a powertrain output, and a steering wheel angle, the side slip angle being an angle between a direction of travel of the wheel and a longitudinal axis of the wheel;
upon determining that a magnitude of the predicted side slip angle exceeds a threshold, specifying a prescribed camber angle of the wheel and a prescribed toe angle of the wheel, a prescribed brake pressure, and a prescribed powertrain output to reduce the magnitude of the predicted side slip angle below the threshold;
actuating a motor to rotate a leadscrew of a strut assembly to move the wheel to the prescribed camber angle;
adjusting a tie rod to which the wheel is mounted to move the wheel to the prescribed toe angle;
actuating a brake to provide the prescribed brake pressure; and
actuating a powertrain to provide the prescribed powertrain output.

17. The method of claim 16, further comprising specifying respective prescribed camber angles and respective prescribed toe angles for each of a plurality of wheels upon determining that the magnitude of the predicted side slip angle of the wheel exceeds the threshold.

18. The method of claim 16, further comprising, upon determining that the predicted side slip angle is a positive value that exceeds a positive threshold, specifying the prescribed camber angle of a front wheel to a camber angle greater than a current camber angle of the front wheel and specifying the prescribed camber angle of a rear wheel to a camber angle less than a current camber angle of the rear wheel.

19. The method of claim 16, further comprising, upon determining that the predicted side slip angle is a negative value that is below a negative threshold, specifying the prescribed camber angle of a front wheel to a camber angle less than a current camber angle of the front wheel and specifying the prescribed camber angle of a rear wheel to a camber angle greater than a current camber angle of the rear wheel.

20. The method of claim 16, further comprising specifying the prescribed camber angle of the wheel based on a steering wheel angle.

* * * * *